(12) United States Patent
Tunning (10) Patent No.: US 7,165,215 B2
(45) Date of Patent: Jan. 16, 2007

(54) PANE ELEMENT

(75) Inventor: Brian R. Tunning, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 10/602,573

(22) Filed: Jun. 24, 2003

(65) Prior Publication Data

US 2004/0268232 A1     Dec. 30, 2004

(51) Int. Cl.
*G06N 3/00* (2006.01)

(52) U.S. Cl. .............................. 715/513; 715/792

(58) Field of Classification Search .............. 715/513, 715/792; 345/762
See application file for complete search history.

(56) References Cited

U.S. PATENT DOCUMENTS

| | | | | |
|---|---|---|---|---|
| 5,838,906 | A * | 11/1998 | Doyle et al. .............. | 715/501.1 |
| 6,230,174 | B1 * | 5/2001 | Berger et al. ................ | 715/513 |
| 6,732,331 | B1 * | 5/2004 | Alexander ................... | 715/513 |
| 6,771,291 | B1 * | 8/2004 | DiStefano, III ............. | 715/762 |
| 2003/0020671 | A1 * | 1/2003 | Santoro et al. .............. | 345/1.3 |
| 2003/0137540 | A1 * | 7/2003 | Klevenz et al. ............. | 345/762 |
| 2004/0205604 | A1 * | 10/2004 | Read .......................... | 715/517 |

OTHER PUBLICATIONS

Nadav Savio, Introducing DHTML Behaviors, Nov. 18, 1998, Webmonkey, 1-10.*
Dino Esposito, Cutting Edge (Element Behaviors in Internet Explorer 5.5), Dec. 2000, MSDN Magazine, pp. 1-13.*
Java Sun, How to use Internal Frames, 1995-2005, Java Sun, pp. 1-6.*
Michael Gellis, Behavior Code (Learn to use IE's DHTML behaviors in a browser-based VB application), Nov. 1999, DevX.com, pp. 1-5.*
Paul Festa, IE 5.5 angers Web Standards Advocates, Jul. 2000, CNET News.com, pp. 1-4.*

* cited by examiner

*Primary Examiner*—Stephen Hong
*Assistant Examiner*—Manglesh Patel
(74) *Attorney, Agent, or Firm*—Lee & Hayes, PLLC (57) ABSTRACT

Subject matter includes an exemplary pane element for use in a web page document to generate a pane consisting of a division of a computer display screen. When a web browser encounters the exemplary pane element, the browser is directed to pane-generating instructions, which are substituted as markup language for the exemplary pane element. The pane-generating instructions may be an element behavior bound to an exemplary pane element.

18 Claims, 12 Drawing Sheets

PANE ELEMENT

CROSS-REFERENCE TO RELATED APPLICATIONS

The instant application is related to co-pending U.S. patent application Ser. No. 10/602,572, entitled "Content Template System" by Brian Tunning which is filed concurrently herewith, assigned to the assignee of the present invention, and incorporated herein by reference for all that it teaches and discloses.

TECHNICAL FIELD

The subject matter relates generally to web page authoring and more specifically to an exemplary pane element.

BACKGROUND

Software applications for standalone computing devices often feature sophisticated and interactive graphical user interfaces (GUIs) having windows. Dialogue windows for user input (i.e., modal windows) can be dazzling in the interactive detail of their text dialogue boxes, buttons, and icons and in the power and variety of editing tools made available to a user. Even non-modal windows are highly customized in many software applications and sophisticated in the manner in which they change focus, layer with each other, and interact with a primary window. Pop-up menus, having layered submenus and shortcut keys are taken for granted. All these elegant GUIs, however, are difficult to reproduce in web pages to be used on an internet because web pages generally use web content publishing languages, such as hypertext markup language (HTML). Application programmers and web page authors have very different tools at their disposal.

Conventionally, markup languages, such as HTML, do not have the interface capability of a GUI platform for a software application. This increases the skill required for entry-level and even experienced web designers to produce web pages that have sophisticated interactive functionality: the web designer must also be a programmer, or at least rely on one.

Dynamic HTML (DHTML) and web scripting have increased the capability of HTML and other languages that are popular for creating web pages to perform with more sophisticated interactivity. But this improvement still does not approach that of software application GUIs, especially with respect to web pages used with different types of browsers. A web page author contemplating either a sophisticated GUI or a customized window in a web page has limited choices: write additional web pages to create entirely separate windows (serious programming commitment), or use "canned" web page code to make stock windows (not very customizable). Writing another web page, to be created as an entirely separate window, e.g., for an interactive dialogue, complicates accessing variables and/or content on the primary web page originating the new web page window and requires the web page developer to write event-trapping code to invoke the dialogue.

Figure 1:
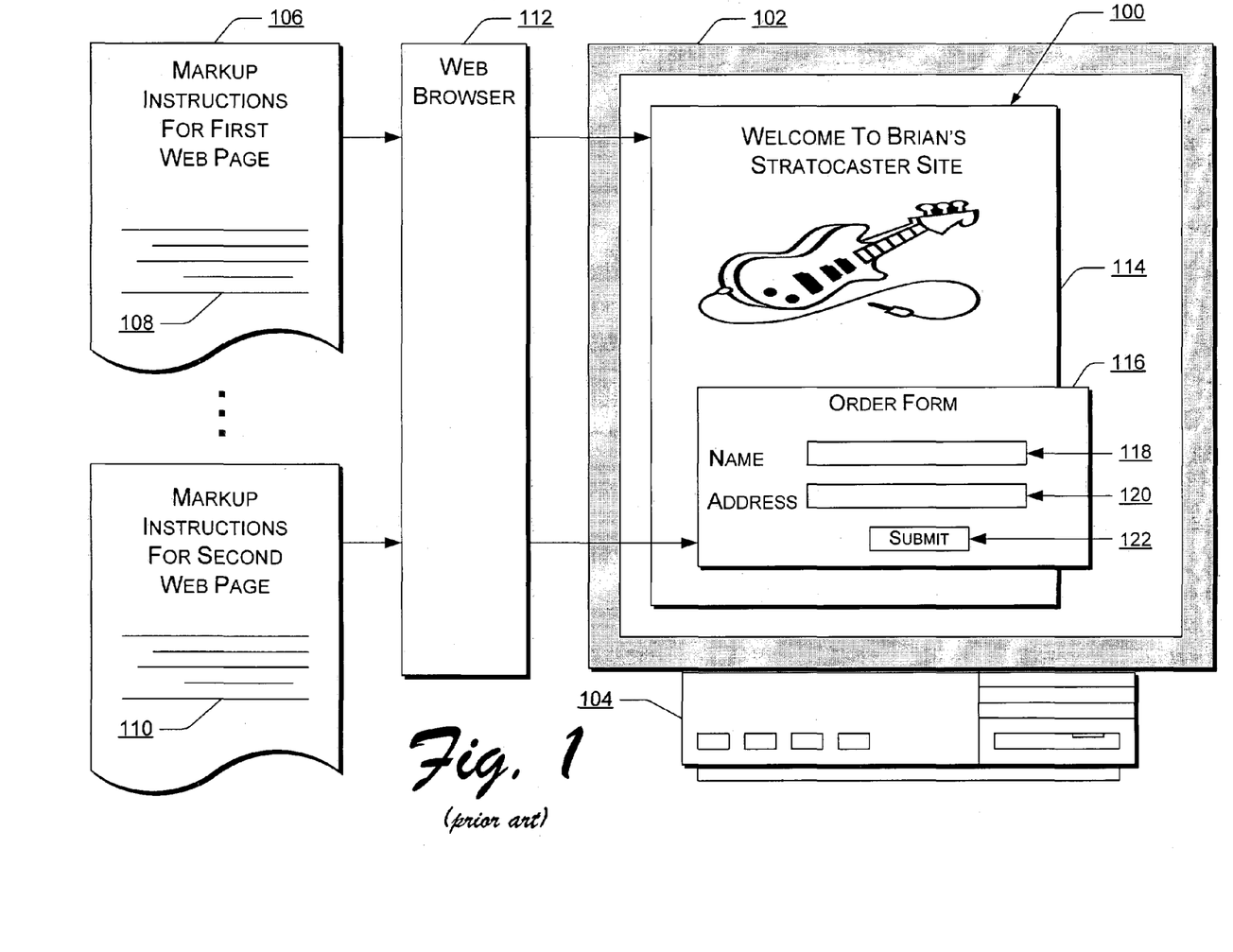
FIG. 1 is a graphic representation of a conventional method of generating web page windows.

FIG. 1 shows a conventional website 100 appearing on a display screen 102 of a computing device 104, wherein a web page document 106 includes a program listing having markup instructions 108, 110 that are rendered by a web browser 112 into a graphical user interface (GUI) consisting of multiple web page windows 114, 116. (A web page document 106 is to be distinguished from a content document, such as a text document, that is displayed as textual content in a rendered web page.) An introductory or home web page window 114 typically links or branches to a more interactive web page window 116 having one or more interactive user interfaces (UIs) 118, 120, 122 if a user decides to engage in a dialogue or transaction via input and/or editing controls of the interactive web page window 116. To present an interactive web page window 116 having interactive UIs 118, 120, 122 suitable for substantial dialogue or transactions, a web designer typically embarks on multiple separate web page projects, one for each web page window associated with the website 100. Having to design a separate web page for each window may discourage some web designers, especially when some of the windows to be used in a website 100 include relatively complex interactive dialogue and/or transaction controls.

SUMMARY

Subject matter includes an exemplary pane element for use in a web page document to generate a pane consisting of a division of a computer display screen. When a web browser encounters the exemplary pane element, the browser is directed to pane-generating instructions, which are substituted as markup language for the exemplary pane element. The pane-generating instructions may be an element behavior bound to an exemplary pane element.

DETAILED DESCRIPTION

Overview

Subject matter presented herein includes an exemplary markup language element referred to as an exemplary "pane" element or tag. When rendering an exemplary pane element, a web browser is referred to pane-generating instructions underlying the exemplary pane element. The pane-generating instructions may be an element behavior bound to the exemplary pane element. The pane-generating instructions may be substituted in markup language form for the exemplary pane element during execution by a web browser. This allows sophisticated, custom pane-generating logic to be used in a web page-producing document, such as an HTML document, without the web designer having to be proficient in programming the pane-generating instructions.

An exemplary pane is a division of a computer display screen, usually a rectangular area that has boundaries. Exemplary panes can be opened, closed, and moved around on a computer display screen and may contain interactive elements of a graphical user interface (GUI). According to one aspect of the subject matter, a user can adjust dimensions (size and shape), format, color, and placement, etc., of exemplary panes, and the exemplary panes can be overlapped (i.e., layered, cascaded) to increase the usable display screen area of a web page. The overlapping panes can be brought to the front or sent to the back of a group of exemplary panes perceived as a 3-dimensional stack of panes on 2-dimensional display screen surface. The active ("in focus") exemplary pane is that which a user is currently using, and typically appears in front when exemplary panes are overlapped. Exemplary panes may be scrollable to reveal, for example, different areas of a large pane. Different content, applications, or files can be presented on a display screen simultaneously in different exemplary panes. Of course, more than one exemplary pane can be open simultaneously and more than one can be partly or fully visible at once.

An exemplary pane element can encapsulate static and/or dynamic markup language content, allowing a user to customize the layout of a web page for specific needs, such as screen resolution, irregularly of content shape, and priority. An exemplary pane element significantly lowers the entry-level skill needed for web page designers to create more interactive and customizable user interfaces (UIs).

Figure 2:
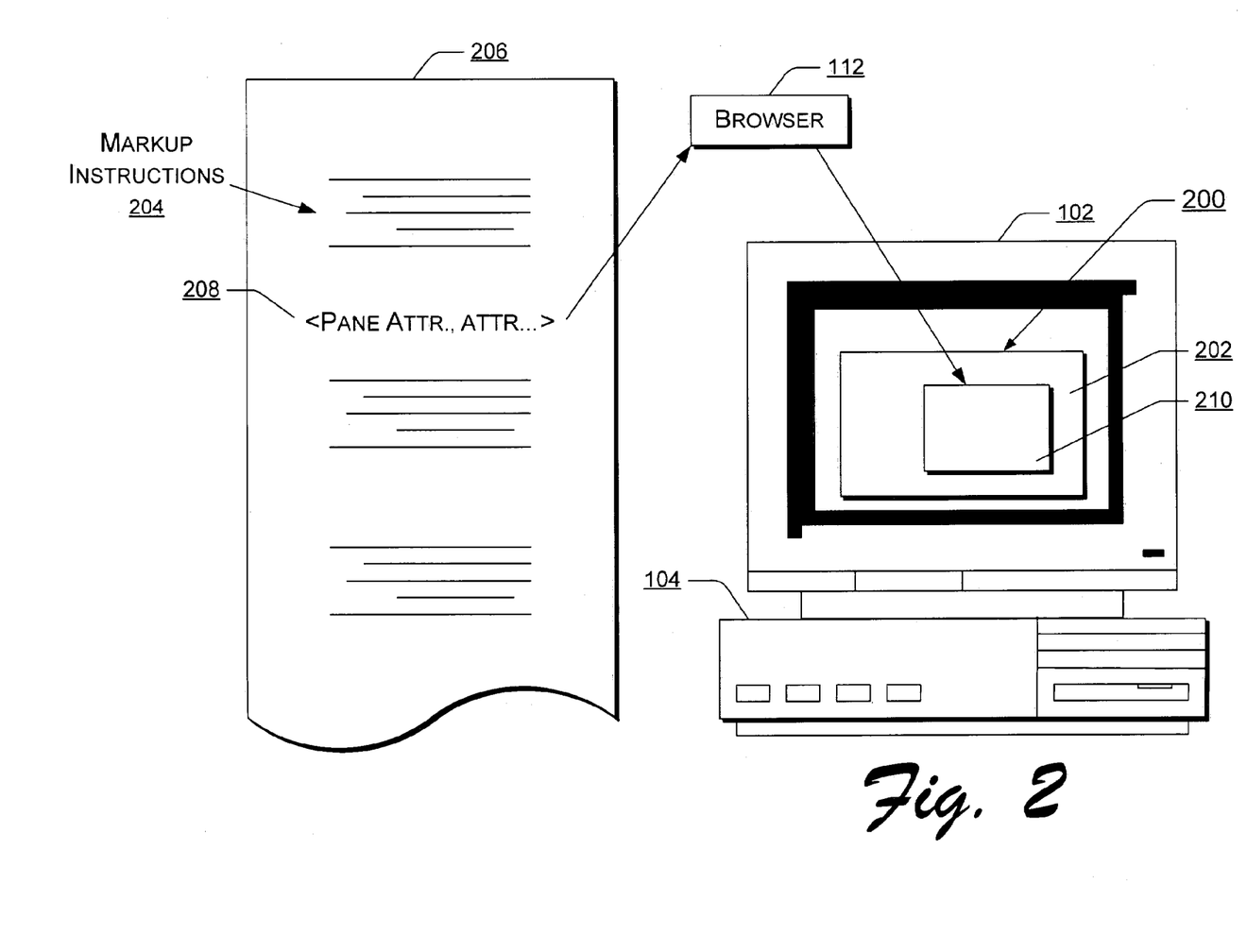
FIG. 2 is a graphic representation of generating an exemplary web page pane using an exemplary pane element.

FIG. 2 shows an exemplary website 200 presented on a display screen 102 of a computing device 104. The exemplary website 200 includes a web page 202 generated by a program listing having exemplary markup instructions 204. The markup instructions 204 are written in a "web page language," such as HTML or another markup language, such as extensible markup language (XML). Languages used to generate a web page 202 are usually limited to those that a web browser can interpret. In this case, the web page document is an exemplary HTML document 206. The exemplary HTML document 206 generates a web page 202 when rendered by a web browser 112.

In one implementation of the subject matter, the exemplary HTML document 206 includes an exemplary pane element 208, which generates and/or designates an exemplary pane 210. To describe an exemplary pane 210, comparison with a conventional web page "window" is helpful. Conventionally, each window appearing on a display screen 102 is roughly equated with separate markup instructions (e.g., 108, 110) for generating separate web page windows (e.g., 114, 116). Instances of an exemplary pane element 208, by contrast, can generate one or many exemplary panes 210 from within markup instructions 204 for a single web page 202 without embarking on programming for separate web pages. Thus, since an exemplary pane element 208 typically automates much of the work of developing separate web page windows, the exemplary pane element 208 can be employed by a novice web designer to conveniently generate one or more exemplary panes 210 from within a unified set of markup instructions 204 without designing each web page window manually.

The amount of automation underlying a particular implementation of an exemplary pane element 208 is not limited, as the underlying pane-generating instructions bound to an implementation of an exemplary pane element 208 can be lengthy and/or sophisticated.

In one implementation of the subject matter, an exemplary pane element 208 may be used in an HTML document 206 in the following general format:

```
<pane>
    ← insert content of pane here
</pane>
```

This example format demonstrates that content to be displayed in the generated exemplary pane 210 can be inserted between an opening markup indicator "tag" and a closing tag.

The actual size of a pane 210 generated and/or designated by an exemplary pane element 208 may depend on the web browser 112 that is employed to render the HTML document 206. Although web browsers may differ in how they interpret and display a web page 202, the interpretive characteristics of a given browser are generally consistent so that the size of an exemplary pane 210 remains in proportion to other panes, e.g., a primary or "home" web page or other windows and/or panes generated by other instances of the exemplary pane element 208 within an HTML document 206.

Figure 3:
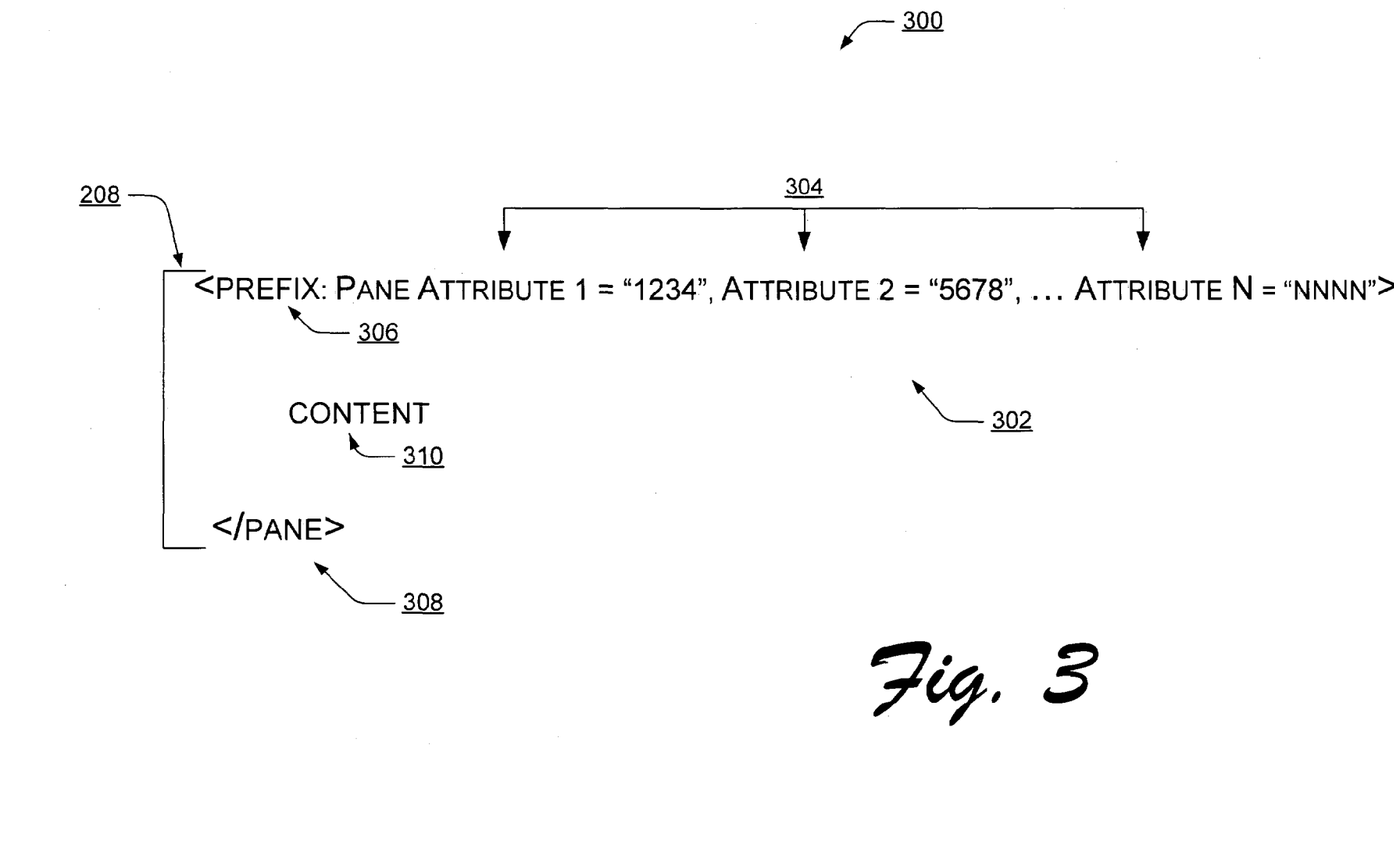
FIG. 3 is a graphic representation of exemplary syntax for an exemplary pane element.

FIG. 3 shows an exemplary syntax 300 of an exemplary pane element 208. In an exemplary opening pane tag 302, implementations of the subject matter can include one or more pane attributes 304 (and associated values). The pane attributes 304 allow a web designer to optionally specify initial dimensions, placement within a web page, etc., of an exemplary pane 210. Thus, an exemplary opening pane tag 302 may have multiple pane attributes 304 by which implementation details of a particular exemplary pane 210 can be abstracted from a web designer via selection of attribute values. A prefix 306, such as system name, may also be used. A closing tag 308 ends the exemplary pane element 208, closing in content 310 to be displayed in an exemplary pane 210.

Figure 4:
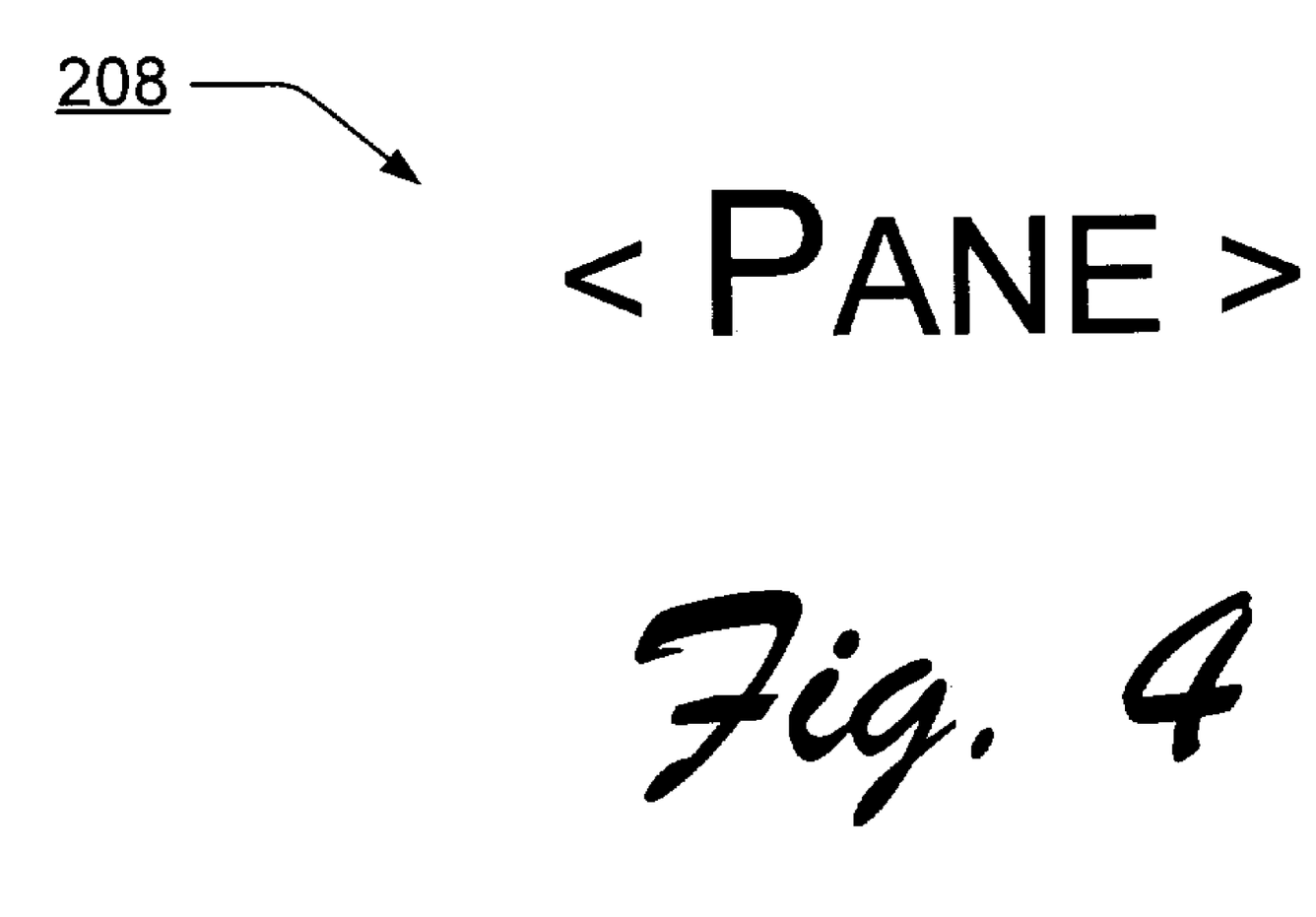
FIG. 4 is a graphic representation of another exemplary syntax for an exemplary pane element.

Alternatively, as shown in FIG. 4, an exemplary pane element 208 can have few or no attributes. This type of implementation may be desirable when an exemplary pane 210 that has consistent characteristics and/or content is to be used repeatedly in a web page design. In one implementation, an exemplary pane element 208 has only an opening pane tag 302 and no closing tag 308.

Figure 5:
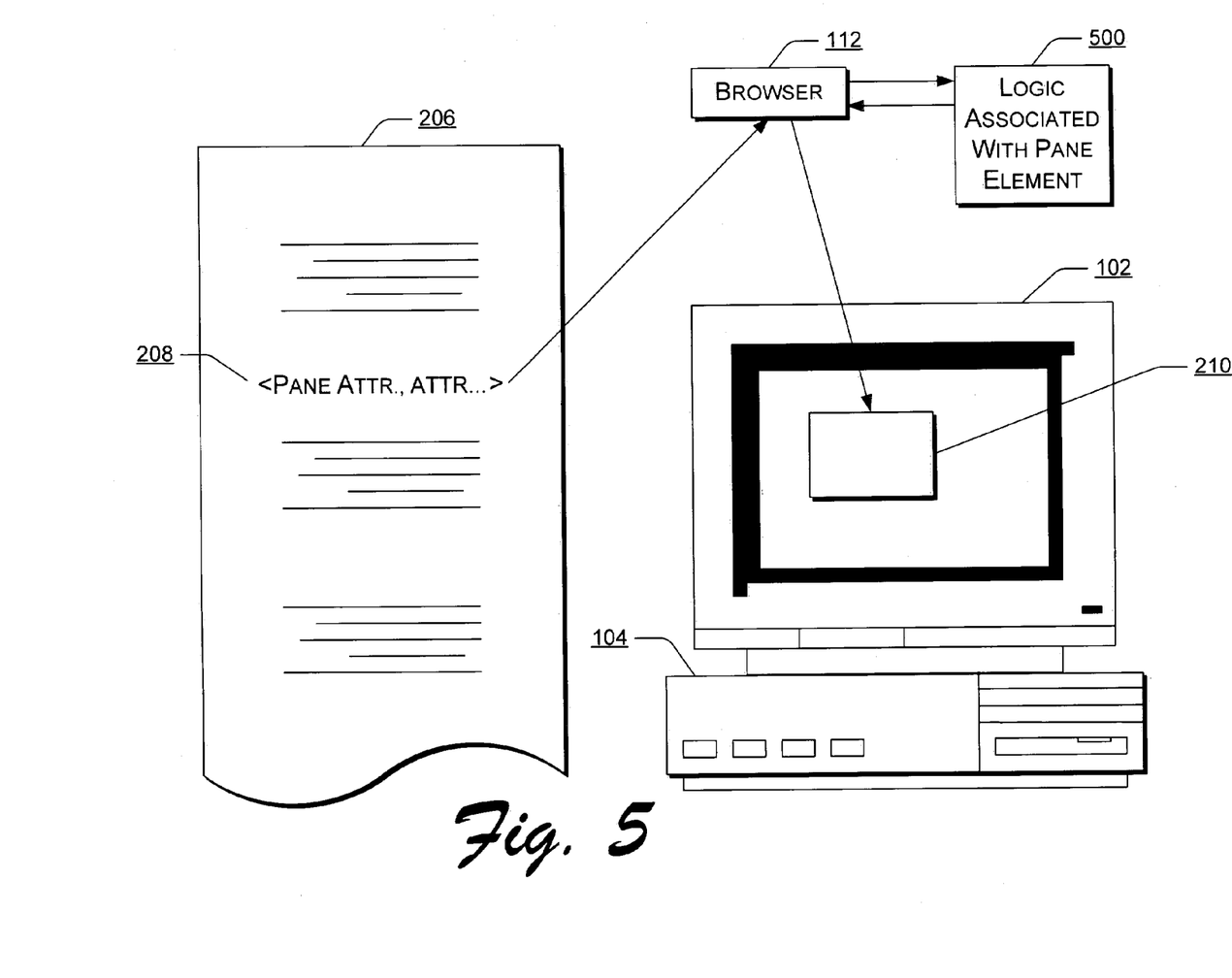
FIG. 5 is a graphic representation of exemplary logic associated with an exemplary pane element.

As shown in FIG. 5, when a web browser 112 renders an exemplary pane element 208, the web browser 112 is referred to a body of associated logic 500 (i.e., pane-generating instructions) underlying the exemplary pane element 208. If associated logic 500 underlying an exemplary pane element 208 is well developed, then an exemplary pane element 208 that has few or no manually selectable attributes may be able to automatically determine pane attributes. On the other hand, well-developed associated logic 500 may also allow a web designer to manually select more kinds of attributes for describing and selecting an exemplary pane 210 to generate than would be possible with rudimentary associated logic 500.

Figure 6:
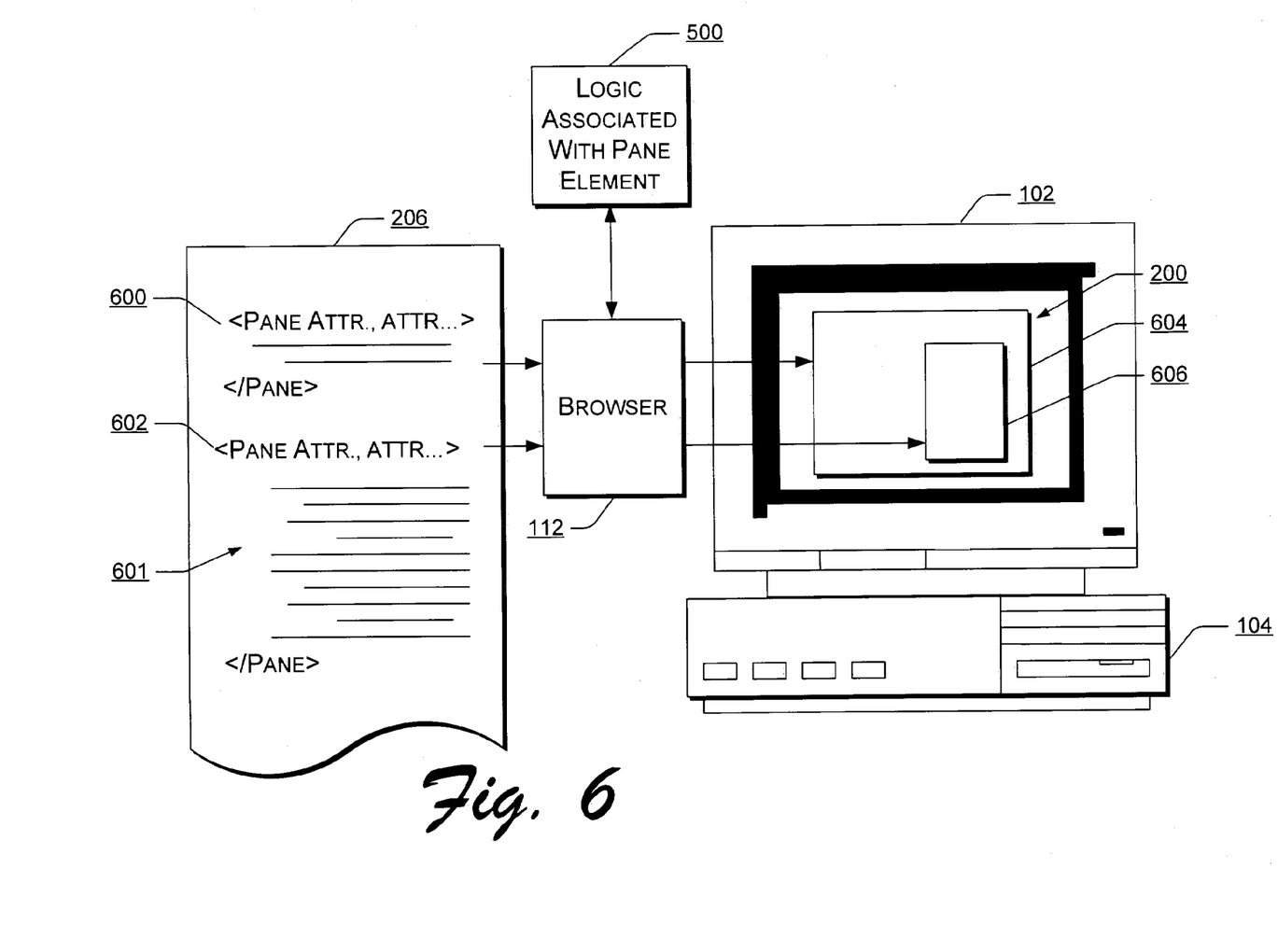
FIG. 6 is a graphic representation of multiple exemplary pane elements generating multiple exemplary web page panes.

FIG. 6 shows exemplary pane elements 600, 602 that have associated logic 500 to dynamically adjust the dimensions of resulting exemplary panes 604, 606 based on the amount of content to be displayed in each exemplary pane 604, 606. Exemplary self-adjusting can be applied to many other attributes of exemplary panes 604, 606, not just to dimension attributes. For example, attributes of an exemplary pane (e.g., 210) may be based on details of user interface controls (e.g., 118, 120, 122) to be included in the exemplary pane 210. There are many characteristics of an exemplary pane 604, 606 that can be determined automatically before the exemplary pane 210 is generated on a display screen 102. In fact, an exemplary pane element 602 can encompass content 601 having content attributes, such as size, shape, color, format, style, and font and these content attributes can also be used to automatically determine pane attributes 304 (for instance, pane dimensions). For example, a large headline font may result in an increased height dimension for an exemplary pane 606.

Figure 10:
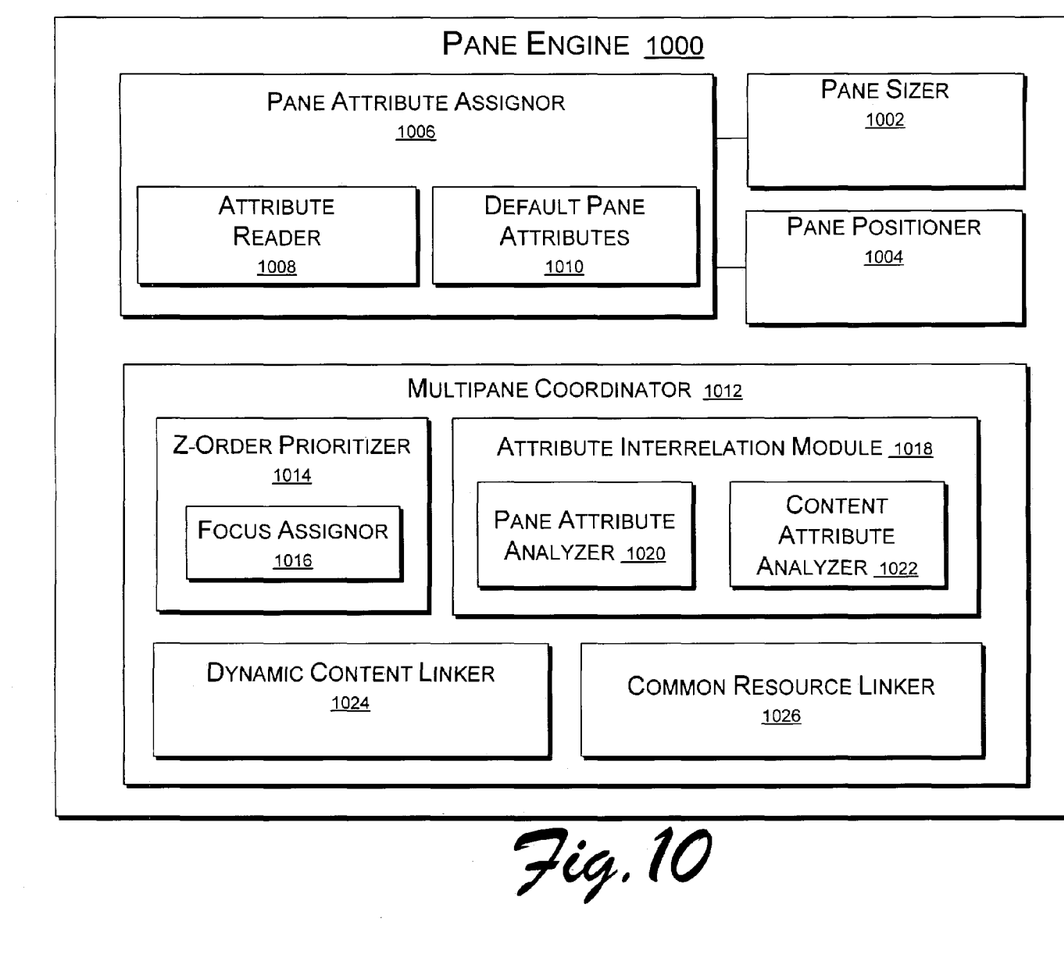
FIG. 10 is a block diagram of an exemplary pane engine.

In some implementations the associated logic 500 discussed above can take the form of an exemplary pane engine 1000 (to be discussed more fully below) that can determine characteristics of content 601 associated with an exemplary pane element 602 and automatically generate (attributes for) an exemplary pane 606 having characteristics needed to display the content 601. For example, an exemplary pane engine 1000 may determine amounts and attributes of header content, text content, link resources, interactive user interfaces, etc., and create an exemplary pane 606 that has appropriate dimensions, color, font, format, placement, etc.

Figure 7:
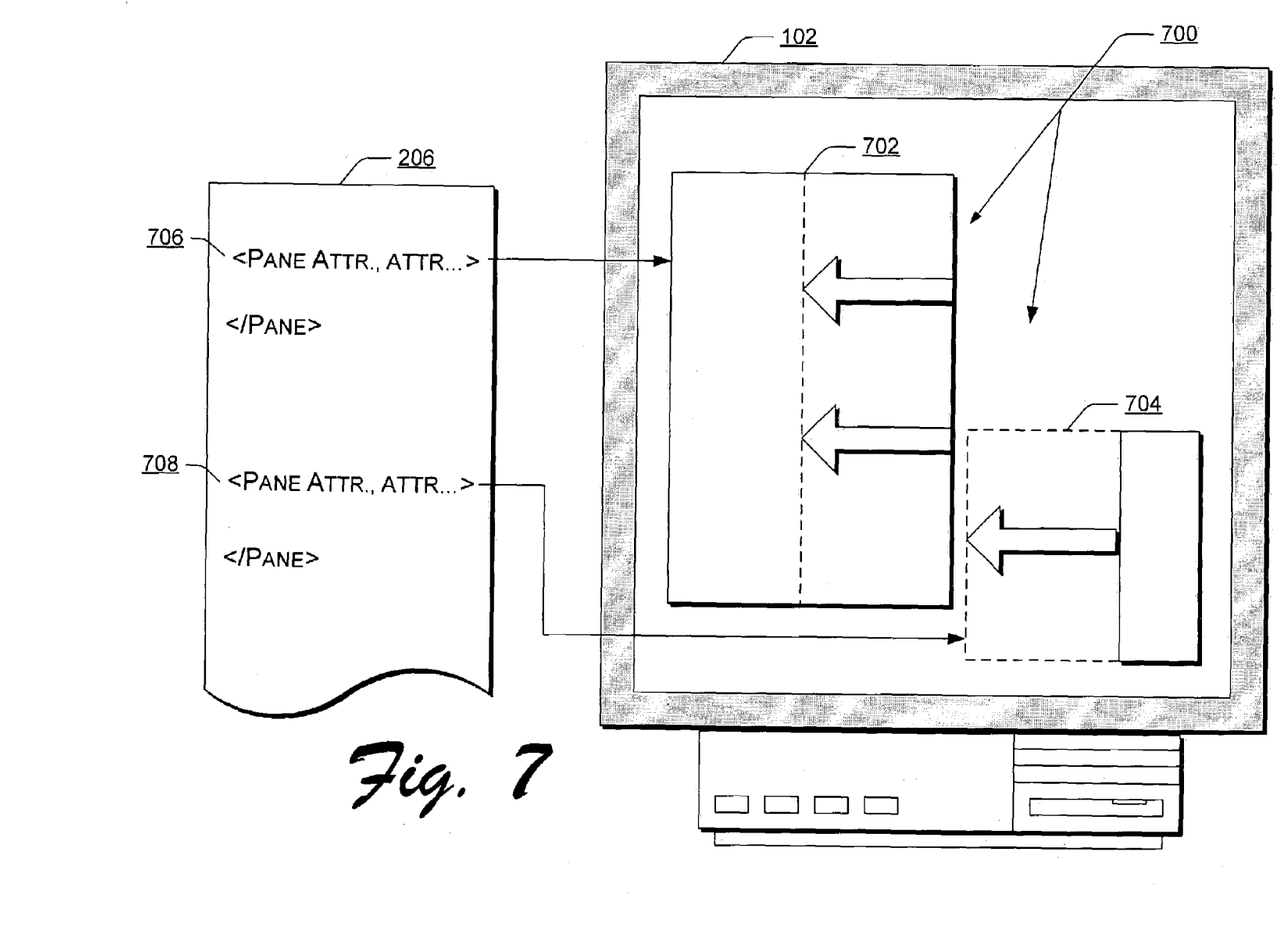
FIG. 7 is a graphic representation of an exemplary interaction between exemplary web page panes as coordinated by exemplary underlying pane-generating logic.

FIG. 7 shows an exemplary interaction 700 between two exemplary panes 702, 704 displayed simultaneously. Associated logic 500 bound to exemplary pane elements 706, 708 coordinates interrelated changes in the two exemplary panes 702, 704. In a scenario in which panes are tiled instead of cascaded, when a first exemplary pane 702 becomes narrower, a second exemplary pane 704 becomes wider to make use of the newly freed space. Thus, attributes of a given exemplary pane 704 can adapt to changes in attributes of another exemplary pane 702.

An exemplary pane 702 may have its size, position, color, z-order priority, style, etc., changed because of corresponding or non-corresponding changes in another exemplary pane 704 being simultaneously displayed or due to the advent of a new exemplary pane. If a new exemplary pane 704 is generated, other exemplary panes 702 may be faded to a less focused color and placed visually behind the new exemplary pane 704 in a perceived stack of panes.

Figure 8:
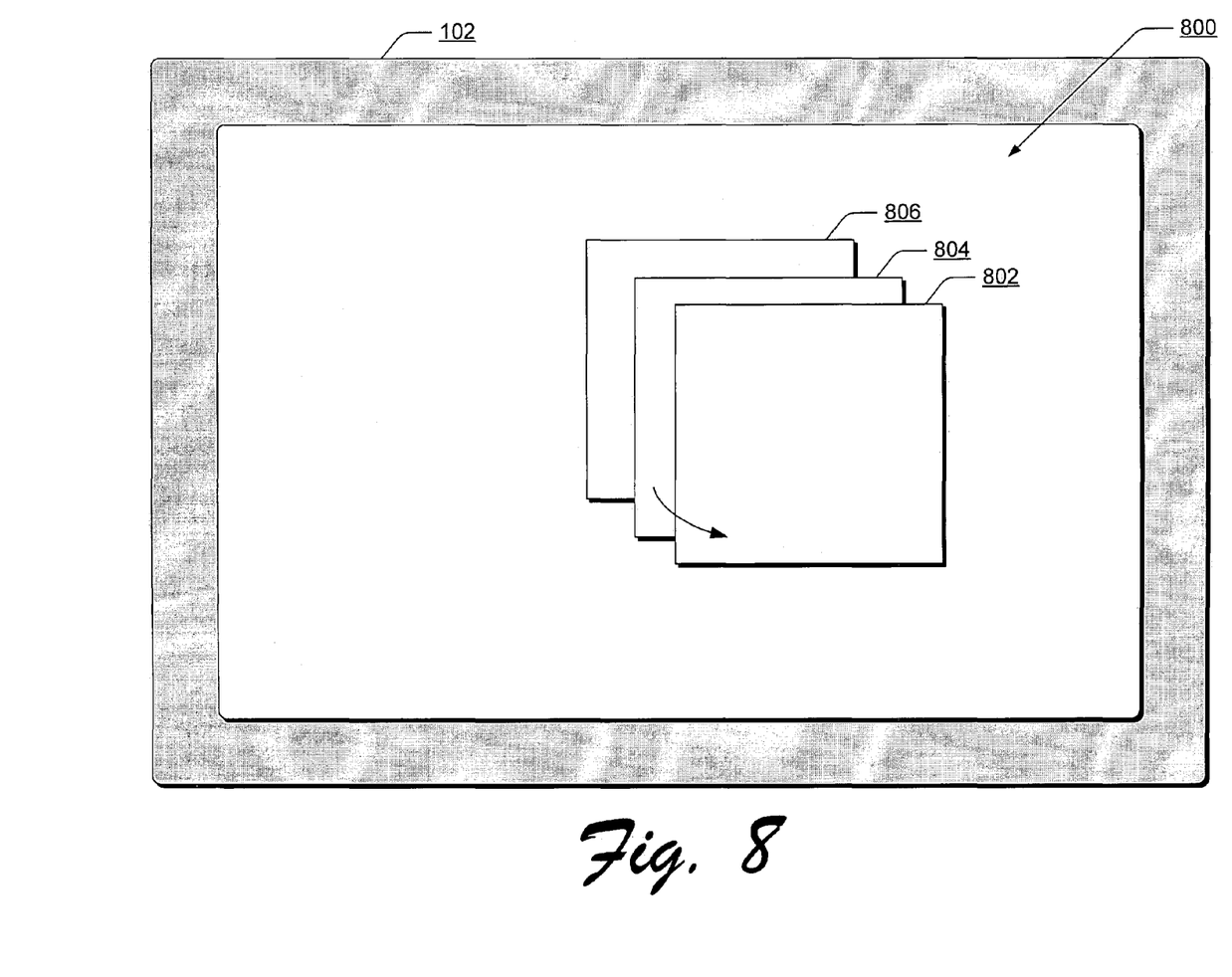
FIG. 8 is a graphic representation of another exemplary interaction between exemplary cascaded web page panes as coordinated by exemplary underlying pane-generating logic.

FIG. 8 shows an exemplary interaction 800 between multiple exemplary panes 802, 804, 806 displayed simultaneously and cascaded based on z-order priority. When a web browser 112 encounters an exemplary pane element 600, a new exemplary pane 802 generated by the exemplary pane element 600 is typically placed by associated logic 500 of the exemplary pane element 600 on top of a perceived 3-dimensional cascaded stack of pre-existing exemplary panes 802, 804, 806 appearing on the 2-dimensional surface of a display screen 102.

The focus and/or z-order priority of an exemplary pane 804 in the stack may change if a user summons the exemplary pane 804 from the stack by clicking on it with a mouse, etc. The associated logic 500 of the exemplary pane element 600 can orchestrate the z-order of multiple exemplary panes 802, 804, 806 in a cascaded stack of panes, or can rearrange a placement order of the exemplary panes 802, 804, 806 when they are arranged in tile format (no cascading).

Figure 9:
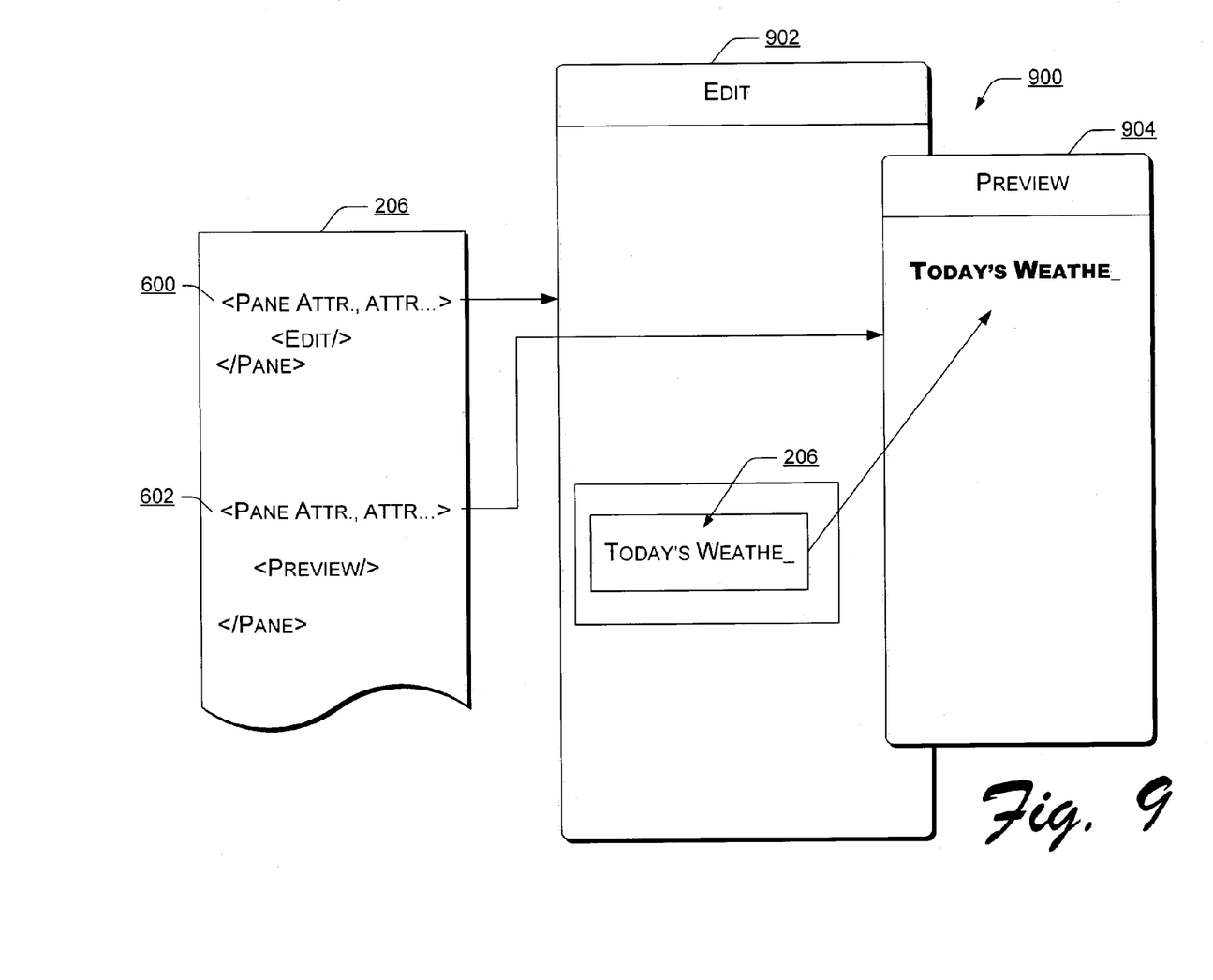
FIG. 9 is a graphic representation of an exemplary interaction generated by exemplary pane-generating logic between two exemplary web page panes, based on changing content in one of the exemplary web page panes.

FIG. 9 shows exemplary interactions 900 between two exemplary panes 902, 904 that are simultaneously, based on changing content. Changes, such as edits, to content 901 in a first exemplary pane 902 are simultaneously displayed in a second exemplary pane 904. These exemplary interactions 900 are controlled by associated logic 500 of the exemplary pane elements 600, 602, which generate the two exemplary panes 902, 904. If a first exemplary pane 902 displays content and the content is changed, then a second exemplary pane 904 may have not only its content changed to reflect the change in the other exemplary pane 904, but may have its pane attributes changed as well. A dynamic change in content reflected in both exemplary panes 902, 904 may be provided by exemplary edit, preview, and resource tags usable in an HTML document 206, as described in co-pending U.S. patent application Ser. No. 10/602,572, entitled "Content Template System" by Brian Tunning. When a first exemplary pane 902 displays content and editing controls to change the content, the second exemplary pane 904 displays the edits to the content in real time. Thus, a real-time web page preview of edits made in an HTML document 206 is accomplished simultaneously with the editing using exemplary pane elements 902, 904. The real-time link between dynamically changing content associated with one exemplary pane 902 and a simultaneous version of the same dynamically changing content displayed in another exemplary pane 904 can be accomplished via exemplary associated logic 500, wherein the content 901 being edited in the first exemplary pane 902 becomes a content resource for the real-time web page being displayed in the second exemplary pane 904.

Implementations Using Element Behaviors

In some implementations, the pane-generating instructions (i.e., associated logic 500 of the exemplary pane element 208) are achieved using a bound, custom "element behavior." When a browser, such as versions of MICROSOFT® INTERNET EXPLORER ("IExplorer"), encounters an exemplary pane element 208, additional element behavior code is substituted for the exemplary pane element 208 and executed to provide the functionality of the exemplary pane element 208. The additional code of an element behavior is usually performed on the client side.

An element behavior may be expressed as underlying associated logic 500, an exemplary pane engine 1000 (to be discussed below), and/or other pane-generating instructions, which then become usable via an exemplary pane element 208 in the same way as "everyday" HTML elements in a web page HTML document 206. Element behaviors can be written in script using an HTML component (HTC) file, or implemented with a DHTML behavior. An element behavior can then be downloaded, parsed, and imported into web page execution via a special processing instruction and permanently bound to an exemplary pane element 208.

Browsers that enable HTC files to define an exemplary pane element 208 provide the quickest and easiest way to create element behaviors using scripting languages such as MICROSOFT VISUAL BASIC® SCRIPTING EDITION (VBSCRIPT), MICROSOFT JSCRIPT®, MICROSOFT WINDOWS® SCRIPT COMPONENT (WSC), and/or MICROSOFT VISUAL C++®. HTC files provide a mechanism to implement components in script as DHTML behaviors. Saved with an ".htc" extension, an HTC is an HTML file that contains script and a set of HTC-specific elements that define the exemplary pane element 208.

Whereas a kind of behavior called an "attached behavior" (bound asynchronously to an HTML element) overwrites the default behavior of an element to which it is attached, element behaviors define new elements, such as an exemplary pane element 208. A web page document that employs exemplary pane elements 208 typically has improved organization and less clutter, since element behaviors are encapsulated in an HTC file. DHTML behaviors defined with HTC files can be used in web pages within the same domain, so element behaviors are an excellent way of creating powerful, reusable exemplary pane elements 208. Once an element behavior has been parsed and initialized, it renders an exemplary pane element 208 into a genuine HTML element, as the element behavior cannot be disconnected from the exemplary pane element 208.

To create and use an exemplary pane element 208 in a web page document the element behavior of the exemplary pane element 208 is first defined in an HTC file and then the definition is imported into the web page document.

In some implementations, an HTML document 206 requires a few additional markings to import a definition of an element behavior of an exemplary pane element 208. For example, an HTML document 206 first declares a namespace, which is used to ensure that the exemplary pane element 208 has a unique qualifier. Then the associated logic 500 of an exemplary pane element 208 is imported into the namespace. Thus, a "pane" namespace imports the implementation of an exemplary pane element 208 from a pane-.htc file:

<?IMPORT namespace="pane" implementation="pane.htc">

In some implementations, the import directive can be important in implementing an element behavior in the web page document. When a web browser 112 begins processing the import directive, it waits until the contents of the corresponding HTC file have downloaded completely before continuing. The manner of processing then causes the element behavior to be bound synchronously to the exemplary pane element 208.

The exemplary pane element 208 itself must be inserted somewhere in the body of the web page document. An exemplary pane element 208 can be used like any other tag, except that the exemplary pane element 208 may use its namespace as the prefix.

Exemplary Pane Engine

FIG. 10 shows an exemplary pane engine 1000, which may be invoked or referenced as a form of associated logic 500 and/or as an element behavior when a web browser 112 encounters an exemplary pane element 208. That is, an exemplary pane engine 1000 is one way to represent the pane-generating instructions and/or the underlying associated logic 500 discussed above that is associated with an exemplary pane element 208, for example, by being bound to the exemplary pane element 208 as an element behavior.

An exemplary pane engine 1000 may contain components to execute an exemplary pane 210 (or assist a web browser 112 to render the exemplary pane 210). A pane sizer 1002 establishes dimensions of an exemplary pane 210 to be generated, and a pane positioner 1004 determines a placement of the exemplary pane 210 on a display screen 102. These attributes (pane dimensions and position) for executing an exemplary pane 210 may be obtained from a pane attribute assignor 1006. In one implementation, a pane attribute assignor 1006 may include default pane attributes 1010, so that when an exemplary pane element 600 is encountered, a working set of pane attributes 304 is immediately available. An attribute reader 1008 may also be included in the pane attribute assignor 1006 to read attributes supplied by a web designer if the syntax of an exemplary pane element 208 allows attributes to be manually specified in a web page document.

In some implementations, an exemplary pane engine 1000 includes a multipane coordinator 1012, which allows an exemplary pane engine 1000 to consider the attributes and behavior of already-implemented exemplary panes 604 when determining attributes to assign to a new exemplary pane 606.

If multiple exemplary panes are cascaded (e.g., 802, 804, 806) then a z-order prioritizer 1014 and a focus assignor 1016 may determine the priority (i.e., depth, layer, order, etc.) of each exemplary pane 802 in the cascaded stack, and also which exemplary pane 802 has focus (i.e., is the top, active exemplary pane 802).

An attribute interrelation module 1018 analyzes how pane attributes and/or content attributes of a first exemplary pane 606 affect a second exemplary pane 606. Accordingly, an attribute interrelation module 1018 includes a pane attribute analyzer 1020 and a content attribute analyzer 1022. The pane attributes of a one exemplary pane 606 may be affected by changes in pane attributes and/or content attributes of another exemplary pane 604. For example, in some implementations the amount of content displayed in a first exemplary pane 604 might affect the size of a second exemplary pane 606. The attribute interrelation module 1018 analyzes whether pane attributes and content attributes of already-existing exemplary panes 604 should affect a given exemplary pane 606 to be generated.

A dynamic content linker 1024 may be included in the exemplary pane engine 1000 so that changes (e.g., edits) of content 901 displayed in one exemplary pane 902 can be simultaneously displayed in another exemplary pane 904.

A common resource linker 1026 may also be included in an exemplary pane engine 1000. Two exemplary panes 902, 904 may be linked to a common content resource, for example a file or an input device, such as a keyboard. When content in the common resource changes (e.g., a user actuates keys on the keyboard), the change is reflected in both of the exemplary panes 902, 904.

Various other configurations of an exemplary pane engine 1000 are possible. The illustrated implementation is presented only as an example.

Exemplary Method

Figure 11:
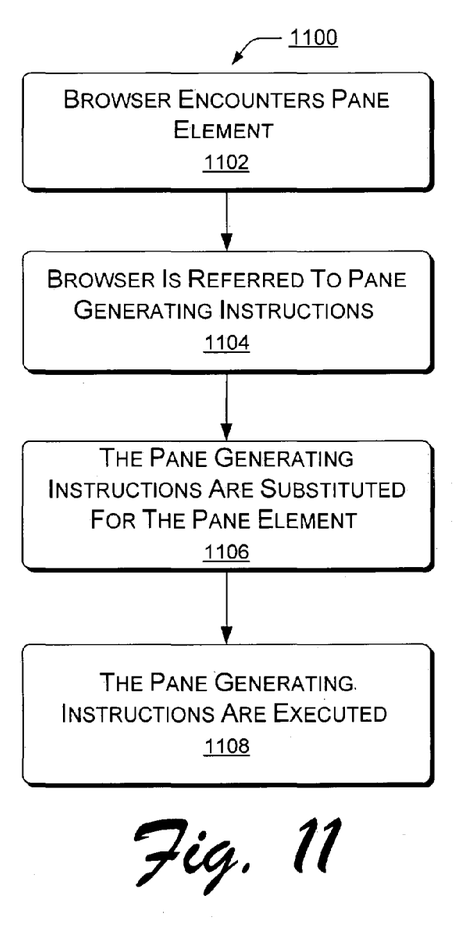
FIG. 11 is a flow diagram of an exemplary method of generating an exemplary web page pane using an exemplary pane element.

FIG. 11 shows an exemplary method 1100 of generating an exemplary pane using an exemplary pane element in a web page document. In the flow diagram, the operations are summarized in individual blocks. The operations of the exemplary method 1100 may be performed in hardware and/or as machine-readable instructions (software or firmware) that can be executed by a processor or a device, such as a device that includes an exemplary pane engine 1000.

At block 1102, an exemplary pane element in a web page document is encountered by a web browser.

At block 1104, the web browser is referred to pane-generating instructions and/or logic associated with the exemplary pane element.

At block 1106, the pane-generating instructions are substituted for the exemplary pane element.

At block 1108, the pane-generating instructions are executed to generate an exemplary pane.

Exemplary Computing Device

Figure 12:
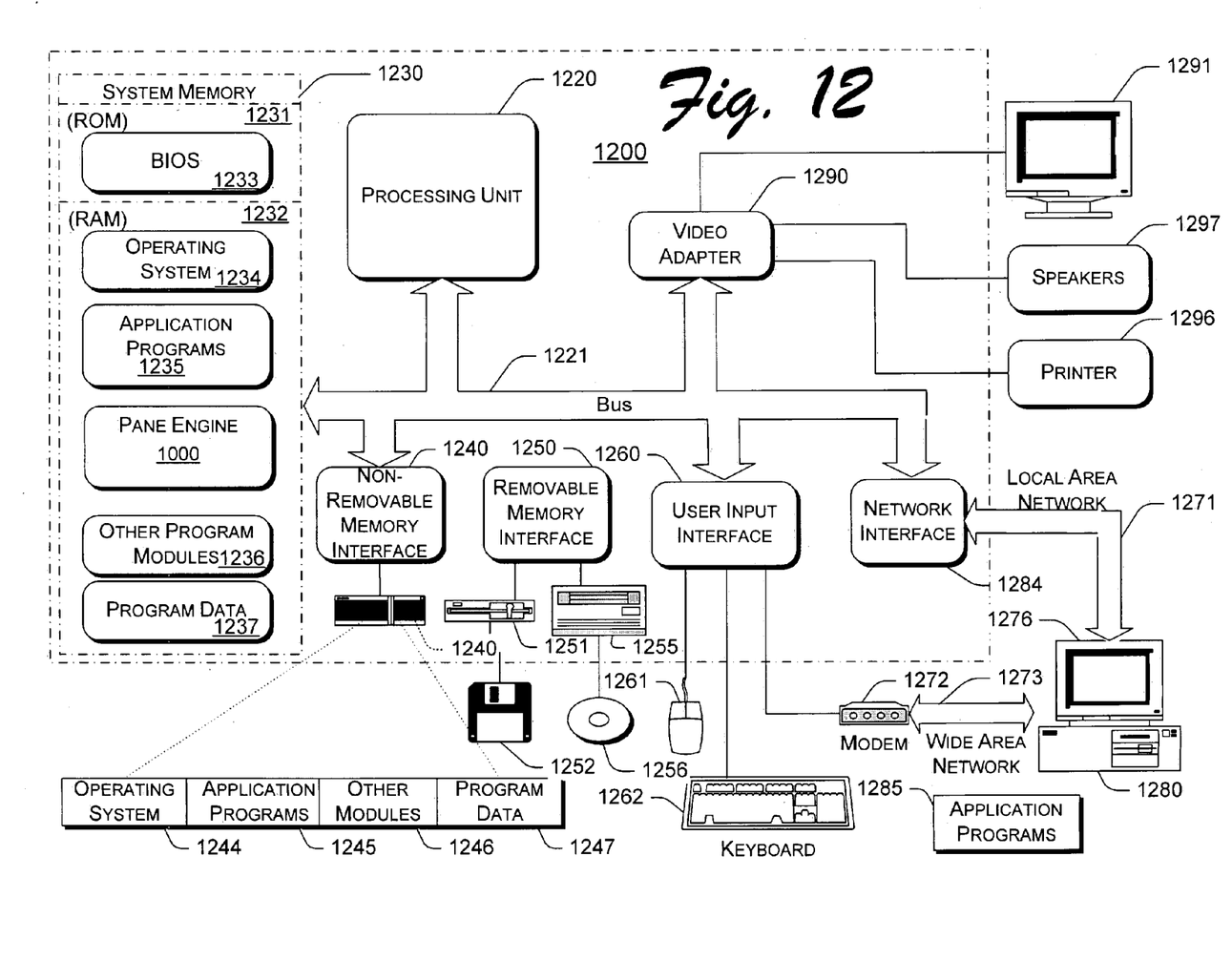
FIG. 12 is a block diagram of an exemplary computing device suitable for use with the subject matter.

FIG. 12 shows an exemplary computer 1200 providing a computing environment in which aspects of the subject matter could be practiced. The components of exemplary computer 1200 may include, but are not limited to, a processing unit 1220, a system memory 1230, and a system bus 1221 that couples various system components including the system memory 1230 to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1200 typically includes a variety of computer-readable media. Computer-readable media can be any available media that can be accessed by exemplary computer 1200 and includes both volatile and nonvolatile media, removable and non-removable media. By way of example, and not limitation, computer-readable media may comprise computer storage media and communication media. Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 1200. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within exemplary computer 1200, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, the exemplary pane engine 1000, application programs 1235, other program modules 1236, and program data 1237. Although the exemplary pane engine 1000 is depicted as software in random access memory 1232, other implementations of an exemplary pane engine 1000 can be hardware or combinations of software and hardware.

The exemplary computer 1200 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, non-volatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface such as interface 1250.

The drives and their associated computer storage media discussed above and illustrated in FIG. 12 provide storage of computer-readable instructions, data structures, program modules, and other data for exemplary computer 1200. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the exemplary computer 1200 through input devices such as a keyboard 1262 and pointing device 1261, commonly referred to as a mouse, trackball, or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port, or a universal serial bus (USB). A monitor 1291 or other type of display device is also connected to the system bus 1221 via an interface, such as a video interface 1290. In addition to the monitor 1291, computers may also include other peripheral output devices such as speakers 1297 and printer 1296, which may be connected through an output peripheral interface 1295.

The exemplary computer 1200 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to exemplary computer 1200, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets, and the Internet.

When used in a LAN networking environment, the exemplary computer 1200 is connected to the LAN 1271 through a network interface or adapter 1270. When used in a WAN networking environment, the exemplary computer 1200 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the exemplary computer 1200, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

CONCLUSION

The foregoing describes an exemplary pane element. The subject matter described above can be implemented in hardware, in software, or in both hardware and software. In certain implementations, the exemplary pane element may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A computer-executable method, comprising:
    executing a pane element comprising an element behavior, wherein the pane element comprises a single element that is readable from a document by a browser, and wherein the executing includes invoking logic associated with the element behavior;
    parsing and initializing the logic to synchronously bind the logic to the pane element, wherein the logic specifies at least some attributes of one or more panes, and wherein the bound logic renders the pane element into a hypertext markup language (HTML) element to which the element behavior is bound;
    executing the HTML element to generate the one or more panes having the specified attributes;
    wherein the bound logic manages display attributes of the one or more panes including a position, a size, and a shape for each pane;
    wherein the bound logic manages linkages between the one or more panes and one or more content resources, such that:
    when only one pane exists then a changing content displayed in the pane is dynamically stored in the content resource in order to initialize subsequent additional panes with the same content;
    when multiple panes exist the content that is common to the multiple panes is dynamically linked between the panes in order to propagate edits in the content simultaneously between the panes; and
    when multiple panes each possess a link to a common content resource, then input from the common content resource and changes to the common content resource are simultaneously implemented in the multiple panes.

2. The computer-executable method as recited in claim 1, wherein the pane element includes a reference to the associated logic.

3. The computer-executable method as recited in claim 1, wherein the pane element includes at least one markup language tag.

4. The computer-executable method as recited in claim 1, wherein the pane element itself comprises an HTML element.

5. A computer-executable method, comprising:
    reading multiple pane elements in the web page document to generate multiple panes in the web page;
    wherein an attribute of content in the first pane is changed based on a change in an attribute of content in the second pane;
    wherein content in the second pane is changed as the content is edited in the first pane;
    executing the pane element wherein the executing invokes logic synchronously bound with the pane element, wherein the bound logic specifies at least some attributes of one or more panes;
    wherein the executing generates the one or more panes having the specified attributes;
    wherein the bound logic manages display attributes of the one or more panes including a position, a size, and a shape for each pane;
    wherein the bound logic manages a linkage between the one or more panes and one or more content resources, such that changes to content that is common between one or more panes and the one or more content resources is simultaneously updated in each of the panes and in each of the content resources.

6. The computer-executable method as recited in claim 5, wherein the web page document comprises HTML.

7. The computer-executable method as recited in claim 5, wherein the pane element includes an associated content displayed in the pane.

8. The computer-executable method as recited in claim 7, wherein the content is one of a text, an image, a link, an interactive control, or a user interface.

9. The computer-executable method as recited in claim 7, wherein the pane element derives content attributes to determine one of a size, a dimension, a shape, a color, a format, a priority, a style, or a font of the content to be displayed in the pane.

10. The computer-executable method as recited in claim 9, wherein the bound logic determines the pane attributes based on the content attributes.

11. The computer-executable method as recited in claim 5, wherein a first pane adjusts a second pane depending on a characteristic or behavior of the first pane.

12. The computer-executable method as recited in claim 5, wherein an attribute of the first pane is adjusted based on changing content in the second pane.

13. A computer-executable pane engine embodied on a computer readable medium addressable via execution of a pane element for generating one or more interrelated panes in a web page, wherein the pane engine comprises a parsed and initiated element behavior bound to the pane element, comprising:
    a pane attribute assignor;
    a pane sizer;
    a pane positioner;
    a list of attributes in which an attribute value is specified and implemented by the pane engine;
    a multipane coordinator to manage interrelations between attributes of multiple panes being concurrently displayed on a user interface;
    a dynamic content linker in the multipane coordinator to dynamically link a content that is common between multiple panes, wherein edits in the content of one pane are simultaneously propagated to the other panes; and
    a common resource linker for multiple panes that each possess a link to a common content resource, wherein the common resource linker sends input from the common content resource to the multiple panes;
    a dynamic content linker to enable changes in a content of a first pane to affect display of a content in a second pane;

a common resource linker, that displays changes in content in the common resource simultaneously in two or more panes.

14. The computer-executable pane engine as recited in claim 13, further comprising default pane attributes for generating the one or more interrelated panes.

15. The computer-executable pane engine as recited in claim 13, further comprising an attribute reader to obtain pane attributes and content attributes selected by a user.

16. The computer-executable pane engine as recited in claim 13, wherein the multipane coordinator includes a Z-order priontizer to determine an order of web page panes in a cascaded stack of web page panes appearing on a display screen.

17. The computer-executable pane engine as recited in claim 13, further comprising a focus assignor to determine which pane of multiple panes is active or on top of a cascaded stack of web page panes appearing on a display screen.

18. The computer-executable pane engine as recited in claim 13, further comprising an attribute interrelation module including a pane attribute analyzer and a content attribute analyzer, wherein a pane attribute of a first pane is determined based on a pane attribute or a content attribute of a second pane.

* * * * *